US011035232B2

(12) United States Patent
Niederriter et al.

(10) Patent No.: US 11,035,232 B2
(45) Date of Patent: Jun. 15, 2021

(54) INDUSTRIAL MACHINE INCLUDING A FLUID SENSOR AND METHOD OF OPERATING THE SAME

(71) Applicant: Joy Global Underground Mining LLC, Warrendale, PA (US)

(72) Inventors: Edward F. Niederriter, Fryburg, PA (US); Philip Rosenstern, Aliquippa, PA (US); Shawn Franklin, Emlenton, PA (US); Troy Amsler, Shippenville, PA (US)

(73) Assignee: JOY GLOBAL UNDERGROUND MINING LLC, Warrendale, PA (US)

( * ) Notice: Subject to any disclaimer, the term of this patent is extended or adjusted under 35 U.S.C. 154(b) by 130 days.

(21) Appl. No.: 16/222,609

(22) Filed: Dec. 17, 2018

(65) Prior Publication Data

US 2019/0360371 A1    Nov. 28, 2019

Related U.S. Application Data

(60) Provisional application No. 62/676,026, filed on May 24, 2018.

(51) Int. Cl.
*E21C 27/02* (2006.01)
*F01M 11/10* (2006.01)
*F16N 29/04* (2006.01)
*E21C 31/12* (2006.01)
*E21C 35/24* (2006.01)

(52) U.S. Cl.
CPC ............. *E21C 27/02* (2013.01); *E21C 31/12* (2013.01); *F01M 11/10* (2013.01); *F16N 29/04* (2013.01); *E21C 35/24* (2013.01); *F01M 2011/146* (2013.01); *F16N 2200/20* (2013.01); *F16N 2260/02* (2013.01)

(58) Field of Classification Search
CPC .......... E21C 27/02; E21C 31/02; E21C 31/12; E21C 35/24; F16N 29/00; F16N 29/04; F16N 11/10; F16N 2200/20; F16N 2260/02; F01M 11/10; F01M 2011/146
USPC ........... 73/53.07, 53.01, 53.05, 61.41, 61.43, 73/61.71
See application file for complete search history.

(56) References Cited

U.S. PATENT DOCUMENTS

| | | | | |
|---|---|---|---|---|
| 3,940,754 | A * | 2/1976 | Weber | E21C 27/02 299/1.6 |
| 4,251,809 | A * | 2/1981 | Cheney | G01F 23/247 324/698 |
| 6,392,562 | B1 * | 5/2002 | Boston | G01N 15/0656 324/204 |

(Continued)

*Primary Examiner* — Janine M Kreck
*Assistant Examiner* — Michael A Goodwin
(74) *Attorney, Agent, or Firm* — Michael Best & Friedrich LLP

(57) ABSTRACT

An industrial machine including a sensor and a controller. The sensor is configured to sense a characteristic of a fluid of the industrial machine. Wherein the characteristic is indicative of a contaminant level. The controller has an electronic processor and a memory. The controller is configured to receive a signal from the sensor indicative of the contaminant level, compare the contaminant level to a threshold, and upon the contaminant level crossing the threshold perform at least one selected from a group consisting of output an alert, and commence a shutdown procedure of the industrial machine.

20 Claims, 6 Drawing Sheets

(56) References Cited

U.S. PATENT DOCUMENTS

| | | | | |
|---|---|---|---|---|
| 2011/0153541 A1* | 6/2011 | Koch | ............... | G06Q 10/06 |
| | | | | 706/52 |
| 2011/0309669 A1* | 12/2011 | Niederriter | ......... | E21C 31/12 |
| | | | | 299/42 |
| 2013/0033090 A1* | 2/2013 | Jokonya | ............ | E21C 35/06 |
| | | | | 299/30 |
| 2017/0081997 A1* | 3/2017 | Potyrailo | ......... | G01N 27/026 |

* cited by examiner

INDUSTRIAL MACHINE INCLUDING A FLUID SENSOR AND METHOD OF OPERATING THE SAME

RELATED APPLICATIONS

This application claims priority to U.S. Provisional Patent Application No. 62/676,026, filed May 24, 2018, the entire contents of which are incorporated herein by reference.

FIELD

Embodiments relate to industrial machines, such as but not limited to, mining machines including longwall shearers.

SUMMARY

Industrial machines, such as mining machines including, but not limited to, haul trucks, load-haul-dump vehicles, continuous miners, miner/bolters, entry drivers, shearers (for example, longwall shearers), road-headers, blast hole drills, front end loaders, and battery haulers, use a variety of fluids (for example, oil, hydraulic fluid, diesel exhaust fluid (DEF), brake fluid, fuel, transmission fluid, washer fluid, power steering fluid, refrigerant, etc.). Contaminated fluids (for example, fluids containing excess water, aluminum, silica, etc.) within the industrial machine may drastically decrease the life of the industrial machine.

For example, some industrial machines may use a spraying device to spray water on a material to be mined. The water is sprayed proximate the industrial machine, which may result in water ingress into oil (for example, lubrication oil within a gear box of the industrial machine). When oil within the industrial machine becomes contaminated with water, the life of gears and bearings (for example, gears and bearings of the gear box), which may be lubricated by the oil, are dramatically reduced. Oil of the industrial machines may be regularly changed and sampled (for example, sampled off site) to prevent such contamination. However, such regular changing and sampling may require shutting down the industrial machine and therefore halting mining operations for extended periods of time. Additionally, sampling of the fluid may take extended periods of time (for example, five or more days). During such a period of time, the industrial machine may be shut down, or may be operating with contaminated fluid.

Thus, one embodiment provides an industrial machine including a sensor and a controller. The sensor is configured to sense a characteristic of a fluid of the industrial machine, wherein the characteristic is indicative of a contaminant level. The controller has an electronic processor and a memory. The controller is configured to receive a signal from the sensor indicative of the contaminant level, compare the contaminant level to a threshold, and upon the contaminant level crossing the threshold perform at least one selected from a group consisting of output an alert, and commence a shutdown procedure of the industrial machine.

Another embodiment provides a method of controlling an industrial machine. The method includes sensing, via a sensor, a contaminant level of the industrial machine, and comparing, via a controller, the contaminant level to a threshold. The method further including, upon the contaminant level crossing the threshold, performing at least one selected from a group consisting of outputting, via a user-interface, an alert, and commencing, via the controller, a shutdown procedure of the industrial machine.

Other aspects of the application will become apparent by consideration of the detailed description and accompanying drawings.

DETAILED DESCRIPTION

Before any embodiments of the application are explained in detail, it is to be understood that the application is not limited in its application to the details of the configuration and arrangement of components set forth in the following description or illustrated in the accompanying drawings. The application is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments of the application may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the application may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components may be utilized to implement the application. For example, "servers" and "computing devices" described in the specification can include one or more processing units, one or more computer-readable medium modules, one or more input/output interfaces, and various connections (e.g., a system bus) connecting the components.

Figure 1:
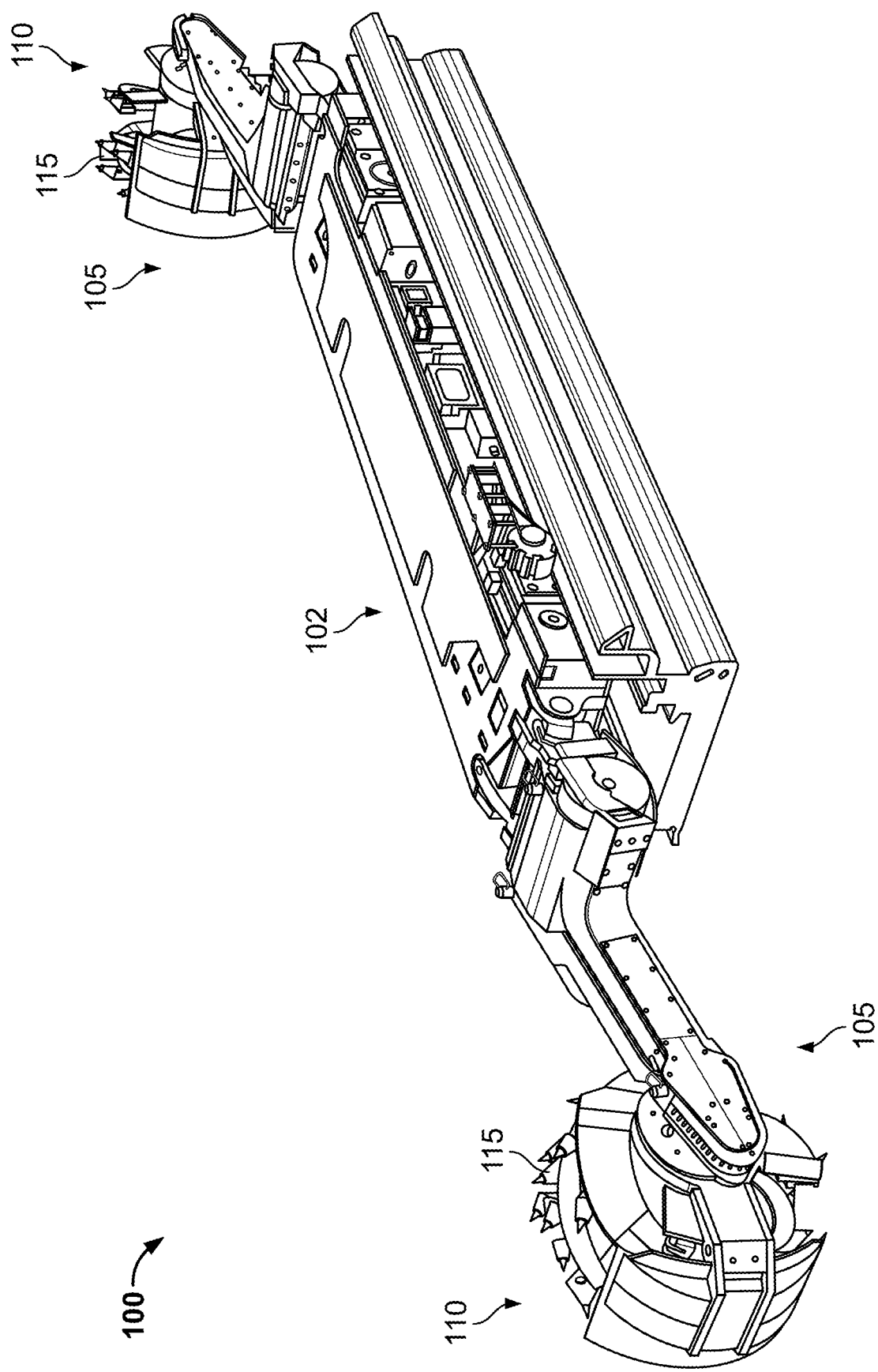
FIG. 1 is a perspective view of an industrial machine according to some embodiments.

FIG. 1 illustrates an industrial machine 100, such as a longwall shearer, according to some embodiments. Although illustrated as a longwall shearer, in other embodiments (not shown), the industrial machine 100 may include a haul truck, a load-haul-dump vehicle, a continuous miner, a miner/bolter, an entry driver, a different shearer, a roadheader, a blast hole drill, a front end loader, a battery hauler, a feeder-breaker, a conveyor assembly, a rope shovel, a hybrid mining shovel, a dragline excavator, or another industrial machine.

Figure 2:
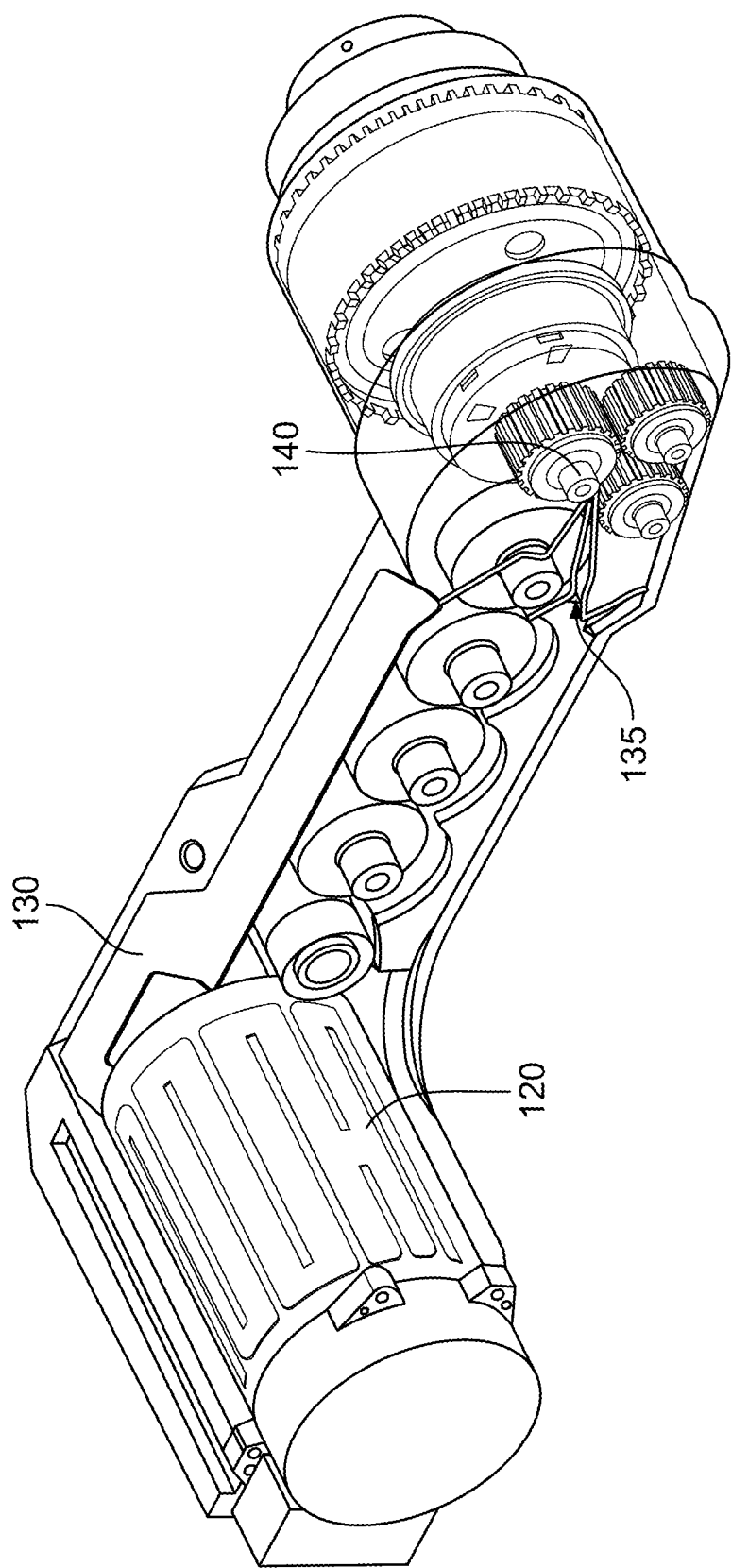
FIG. 2 is a partially cutaway perspective view of a cutter system of the industrial machine of FIG. 1 according to some embodiments.
Figure 3:
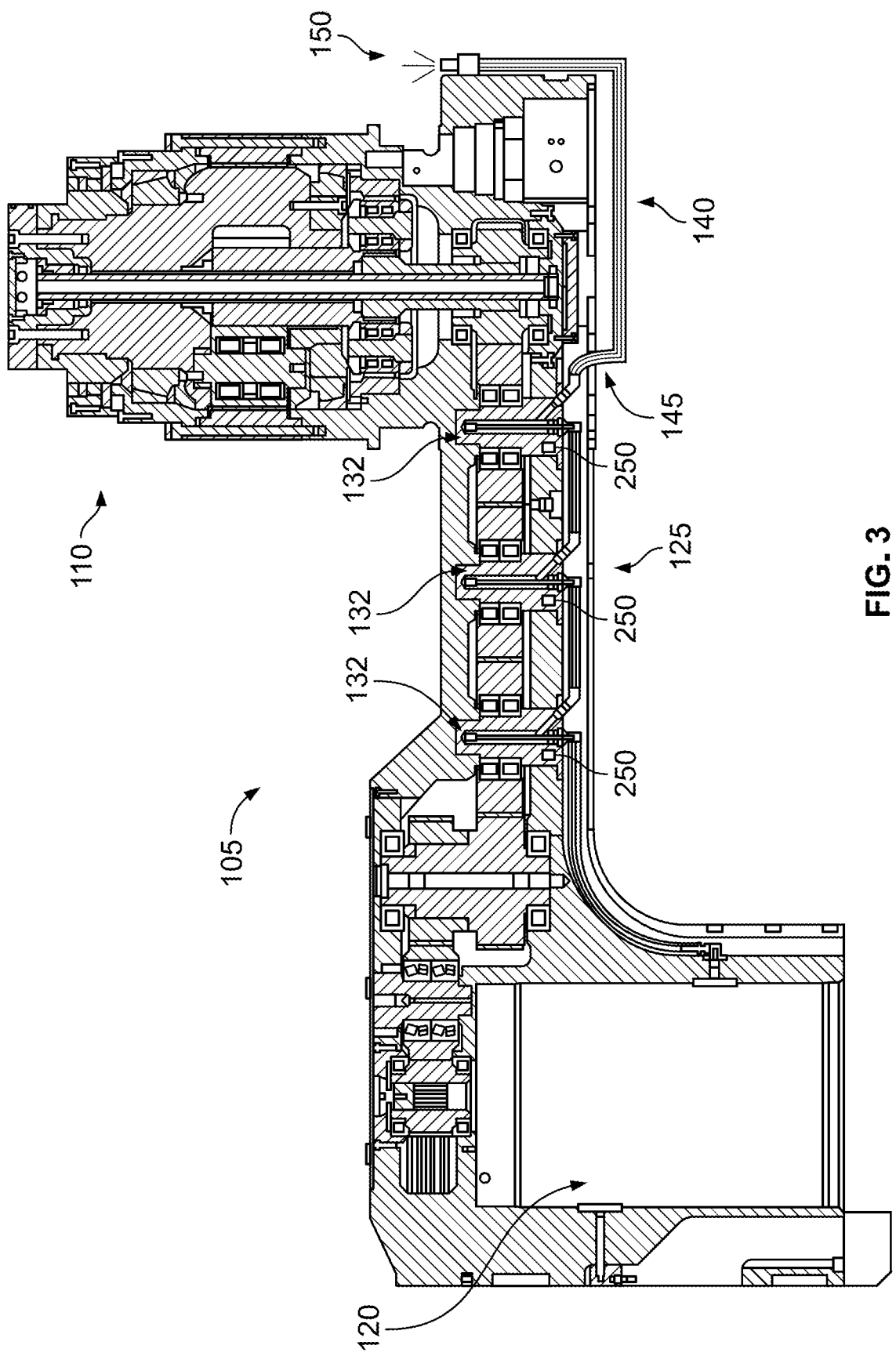
FIG. 3 is partially cutaway top view of the cutter system of FIG. 2 according to some embodiments.

The industrial machine 100 includes a frame 102 supporting a cutter system 105, which includes a rotating drum 110 with teeth 115 that, essentially, cut material (for example, coal) from a surface to be mined. The cutter system 105 is rotationally driven by one or more motors 120 (see FIGS. 2-4) via a gear box 125 (FIGS. 2 and 3). That is, the gear box 125 receives the rotational output of the motor(s) and, in turn, drives the drum 110.

FIGS. 2 and 3 illustrate the cutter system 105 according to some embodiments. The cutter system 105 includes at least one motor 120, the gear box 125, a gear case cooling device 130, a water manifold 135, and a sprayer 140. The one or more motors 120 may be any actuator, such as but not limited to, an alternating-current (AC) motor (e.g., a synchronous motor, an AC induction motor, etc.), a directcurrent motor (e.g., a commutator direct-current motor, a permanent-magnet direct-current motor, a wound field direct-current motor, etc.), and a switch reluctance motor or other type of reluctance motor. In other embodiments, the one or more motors 120 may be hydraulic motors, such as but not limited to, a linear hydraulic motor (i.e., hydraulic cylinders) or a radial piston hydraulic motor. In some embodiments, the one or more motors 120 may be a combination of AC motors, DC motors, and hydraulic motors.

The gear box 125 includes one or more gears 132 configured to transfer rotational movement from the one or more motors 120 to the drum 110. During operation, the one or more gears 132 may generate thermal energy. Thus, a gear case cooling device 130 may be used to cool, as well as lubricate, the gears 132. In some embodiments, the gear case cooling device 130 may provide oil to each gear 132 (for example, within each gear 132 and proximate each gear 132) of the gear box 125.

The water manifold 135 is configured to receive and distribute water to one or more water lines. For example, the water manifold 135 is configured to distribute water to a water inlet 145 of the sprayer 140. The sprayer 140 is configured to spray the water, via the water outlet 150, onto the material to be cut.

During operation, one or more components of the industrial machine 100 may require various fluids (for example, oil, hydraulic fluid, diesel exhaust fluid (DEF), brake fluid, fuel, transmission fluid, washer fluid, power steering fluid, refrigerant, etc.). As discussed above, one example includes oil used to cool and/or lubricate gears 132 of the gear box 125. The various fluids may become contaminated by one or more contaminants (for example water, excess water (for example, within fluids which contain water), aluminum, and silica). For example, water from sprayer 140 may contaminate the oil used to cool and/or lubricate gears 132. In such an example, water may ingress into the gear box 125 via a worn water seal (for example, a worn rotary water seal). As another example, water from sprayer 140 may ingress into a heat exchanger of the cutter system 105, thereby contaminating oil within an oil chamber of the heat exchanger.

Figure 4:
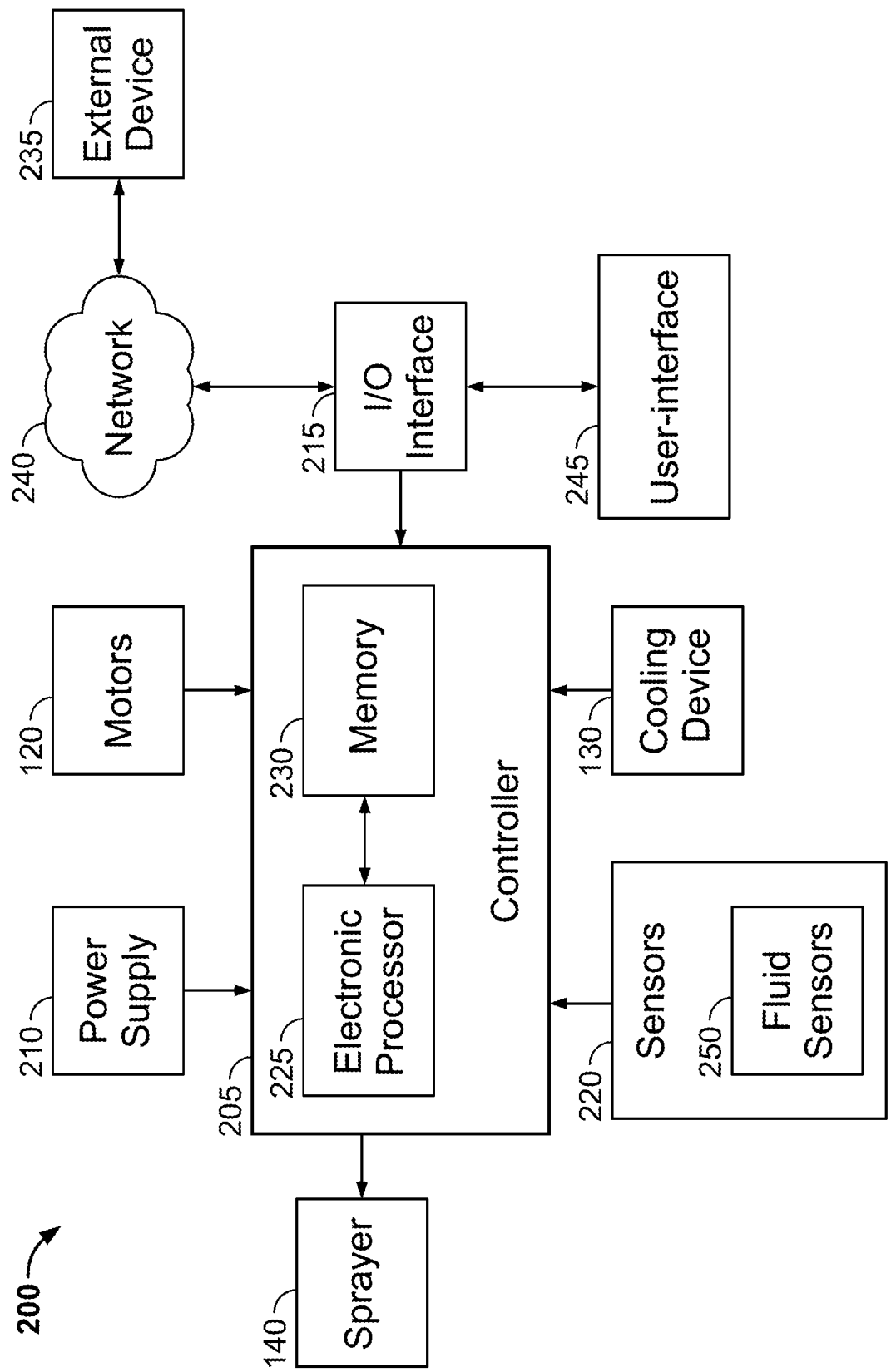
FIG. 4 is a block diagram of a control system of the industrial machine of FIG. 1 according to some embodiments.

FIG. 4 is a block diagram of a control system 200 of the industrial machine 100 according to some embodiments. The control system 200 includes, among other things, a controller 205 having combinations of hardware and software that are operable to, among other things, control the operation of the industrial machine 100 and operation of the control system 200. The controller 205 is electrically and/or communicatively connected to a variety of modules or components of the industrial machine 100, such as but not limited to, the one or more motors 120, the gear case cooling device 130, the sprayer 140, a power supply 210, an input/output (I/O) interface 215, and one or more sensors 220.

In some embodiments, the controller 205 includes a plurality of electrical and electronic components that provide power, operational control, and protection to the components and modules within the controller 205 and/or industrial machine 100. For example, the controller 205 includes, among other things, an electronic processor 225 (e.g., a microprocessor, a microcontroller, or another suitable programmable device) and the memory 230. The electronic processor 225 and the memory 230, as well as the various modules connected to the controller 205 are connected by one or more control and/or data buses. In some embodiments, the controller 205 is implemented partially or entirely on a semiconductor (e.g., a field-programmable gate array ["FPGA"] semiconductor) chip, such as a chip developed through a register transfer level ("RTL") design process.

The memory 230 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The electronic processor 225 is connected to the memory 230 and executes software instructions that are capable of being stored in a RAM of the memory 230 (e.g., during execution), a ROM of the memory 230 (e.g., on a generally permanent basis), or another non-transitory computer readable medium such as another memory or a disc. Software included in the implementation of the industrial machine 100 can be stored in the memory 230 of the controller 205. The software includes, for example, firmware, one or more applications, program data, filters, rules, one or more program modules, and other executable instructions. The controller 205 is configured to retrieve from memory 230 and execute, among other things, instructions related to the control processes and methods described herein. In other constructions, the controller 205 includes additional, fewer, or different components.

Power supply 210 supplies power to the industrial machine 100. In some embodiments, the power supply 210 supplies power having approximately 900 volts alternatingcurrent (VAC) to approximately 4200 VAC (for example, approximately 1000 VAC, approximately 2300 VAC, approximately 3300 VAC, approximately 4160 VAC, etc.). In some embodiment, the power supplied by the power supply 210 may be rectified to a direct-current (DC) and/or be reduced to a nominal voltage. In such an embodiment, the nominal voltage may be used to power components and/or modules within the industrial machine 100 (for example, controller 205).

The I/O interface 215 may be configured to input and output data from the control system 200 to an external device 235, for example, through a network 240. The network 240 may be, for example, a wide area network ("WAN") (e.g., a TCP/IP based network, a cellular network, such as, for example, a Global System for Mobile Communications ["GSM"] network, a General Packet Radio Service ["GPRS"] network, a Code Division Multiple Access ["CDMA"] network, an Evolution-Data Optimized ["EV- DO"] network, an Enhanced Data Rates for GSM Evolution ["EDGE"] network, a 3GSM network, a 4GSM network, a Digital Enhanced Cordless Telecommunications ["DECT"] network, a Digital AMPS ["IS-136/TDMA"] network, or an Integrated Digital Enhanced Network ["iDEN"] network, etc.). In other embodiments, the network is, for example, a local area network ("LAN"), a neighborhood area network ("NAN"), a home area network ("HAN"), or personal area network ("PAN") employing any of a variety of communications protocols, such as Wi-Fi, Bluetooth, ZigBee, etc. In some embodiments, the I/O interface 215 may be configured to communicate with an external device 235 via radio-frequency identification (RFID).

The external device 235 may be any remotely located device. In some embodiments, the external device 235 is a remote server. In such an embodiment, the remote server may store and analyze various characteristics of various mining machines. In other embodiments, the external device 235 may be a smartphone and/or tablet used by an operator of the industrial machine 100.

In some embodiments, the I/O interface 215 is configured to input/output data from the control system 200 to a user-interface 245. The user-interface 245 may be used to control or monitor the industrial machine 100 and includes a combination of digital and analog input or output devices used to achieve a desired level of control and/or monitoring of the industrial machine 100.

The one or more sensors 220 are configured to sensor one or more characteristics of the industrial machine 100. In some embodiments, the one or more sensors 220 are configured to sense one or more electrical characteristics (for example, a temperature, a current, a voltage, and/or a power) of one or more components of the industrial machine 100 (for example, motors 120, gears 132, etc.).

In some embodiments, the one or more sensors 220 include one or more fluid sensors 250. The one or more fluid sensors 250 are configured to sense contaminants with a fluid of the industrial machine 100. In some embodiments, the fluid sensors 250 are electrical (for example, resistivity, conductivity, etc.) sensors. In other embodiments, the fluid sensors 250 include one or more transducers (for example, piezoelectric transducers). In some embodiments, the fluid sensors 250 may sense contamination by measuring a characteristic (for example, a moisture level, a water activity level, a temperature, a water content level, a density, a specific gravity, viscosity, particle quantification, etc.) of the a fluid of the industrial machine 100.

For example, fluid sensor 250 may be an oil sensor configured to sense the presence of water (for example, water from the sprayer 140) in the oil used to cool and/or lubricate the gears 132 of the gear box 125. In some embodiments, the water activity level provides a relative measure for moisture in the oil. The water activity level may represent a ratio between the actual amount of dissolved water and the possible amount of dissolved water in the oil at a certain temperature. In some embodiments, the water activity level may illustrate the how close to saturation the oil is at a certain temperature. In some embodiments, the water content level is an absolute measure approximately equivalent to the amount of water in the oil. The water content level may be measure in parts per million (ppm) and may be independent of the temperature of the oil. In some embodiments, the fluid sensors 250 are electrical (for example, resistivity, conductivity, etc.) sensors. In other embodiments, the fluid sensors 250 include one or more transducers (for example, piezoelectric transducers).

In general operation, the control system 200 receives information from the one or more sensors 220 and/or the user-interface 245. The control system 200 may then control the motor(s) 120, cooling device 130, and sprayer 140 based on the received information. The control system 200 may further output information concerning the industrial machine 100 via the I/O interface 215.

In one embodiment of operation, the controller 205 receives one or more signals, from a fluid sensor 250, indicative of a contaminant level (for example, a moisture level of the oil, a water activity level of the oil, a temperature of the oil, and/or a water content level of the oil). The controller 205 compares the contaminant level to one or more thresholds. If the contaminant level crosses the one or more thresholds, the controller 205 may output an alarm and/or commence a shutdown procedure of the industrial machine 100.

In one embodiment of operation, the controller 205 receives one or more signals, from a fluid sensor 250, indicative of a contaminant level and outputs, via the I/O interface 215, the contaminant level to the external device 235 (for example, a server). The external device 235 may then store the contaminant level. The external device 235 may further analyze the contaminant level of the industrial machine 100, over time, in order to determine potential future issues with the industrial machine 100. In some embodiments, external device 235 may monitors a plurality of mining machines and analyze their respective contaminant levels.

In some embodiments, the external device 235 may determine trends based on the contaminant levels of one or more mining machines 100. In such an embodiment, the external device 235 may determine the seriousness of one or more contaminant levels to determine the best course of action (for example, halting operations of the mining machine 100, decreasing operations of the mining machine 100, etc.).

Figure 5:
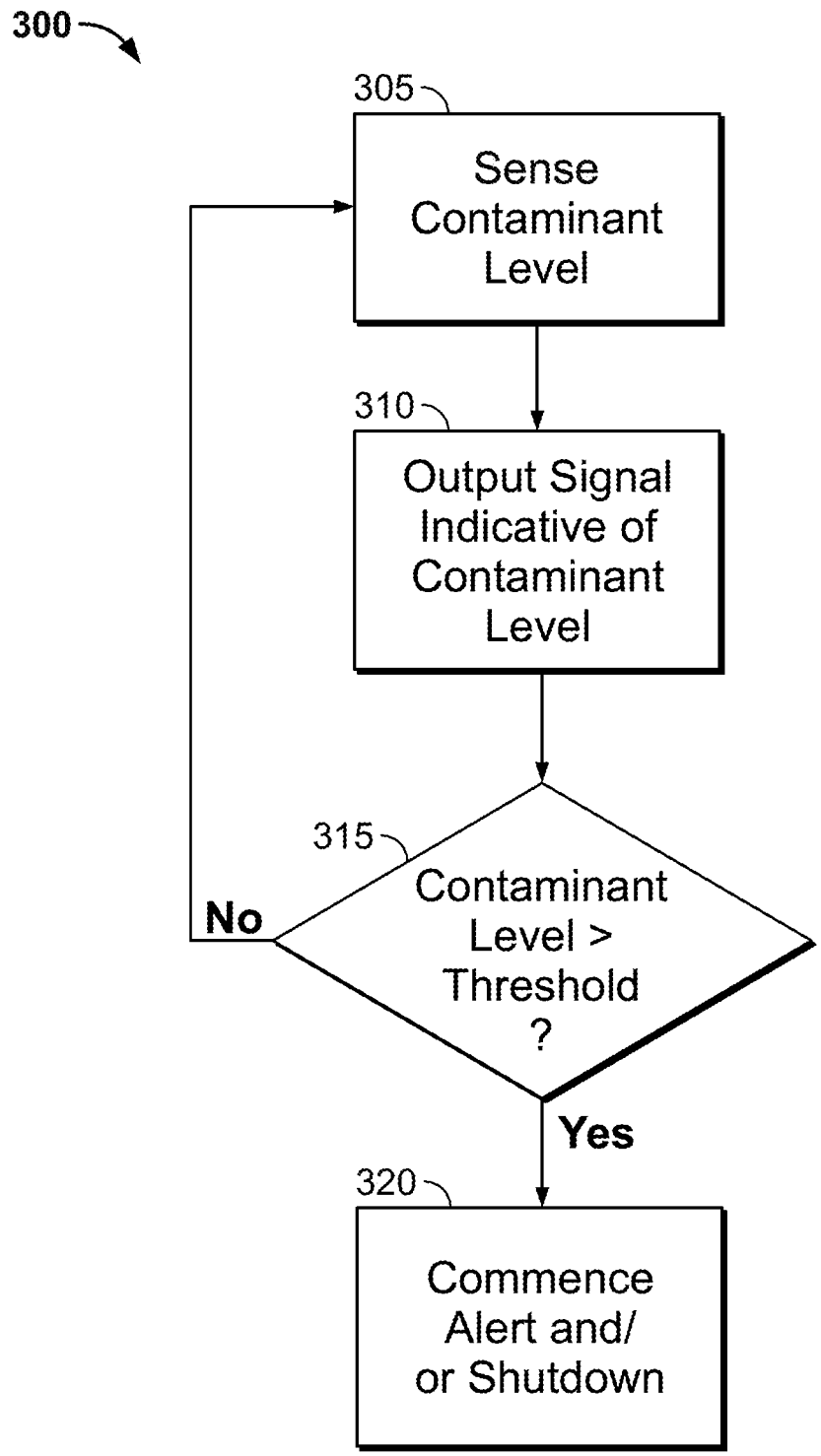
FIG. 5 is a flowchart illustration an operator or process of the industrial machine of FIG. 1 according to some embodiments.

FIG. 5 is a flow chart illustrating a process 300 of the industrial machine 100 according to some embodiments. It should be understood that the order of the steps disclosed in process 300 could vary. Furthermore, additional steps may be added to the sequence and not all of the steps may be required. At block 305, the one or more fluid sensors 250 sense a characteristic indicative of a contaminant level. A signal indicative of the contaminant level is then output to the controller 205 and/or the external device 235 (block 310). The controller 205 and/or the external device 235 determine if the contaminant level crosses a threshold (block 315). If the contaminant level does not cross the threshold, process 300 cycles back to block 305. If the contaminant level crosses the threshold, the controller 205 and/or the external device 235 commences an alert and/or shutdown procedure (block 320).

In some embodiments, when the contaminant level crosses a first threshold, an alert (for example, via the user-interface 245 and/or the external device) is generated. In such an embodiment, when the contaminant level crosses a second threshold, the industrial machine 100 is shutdown.

Figure 6:
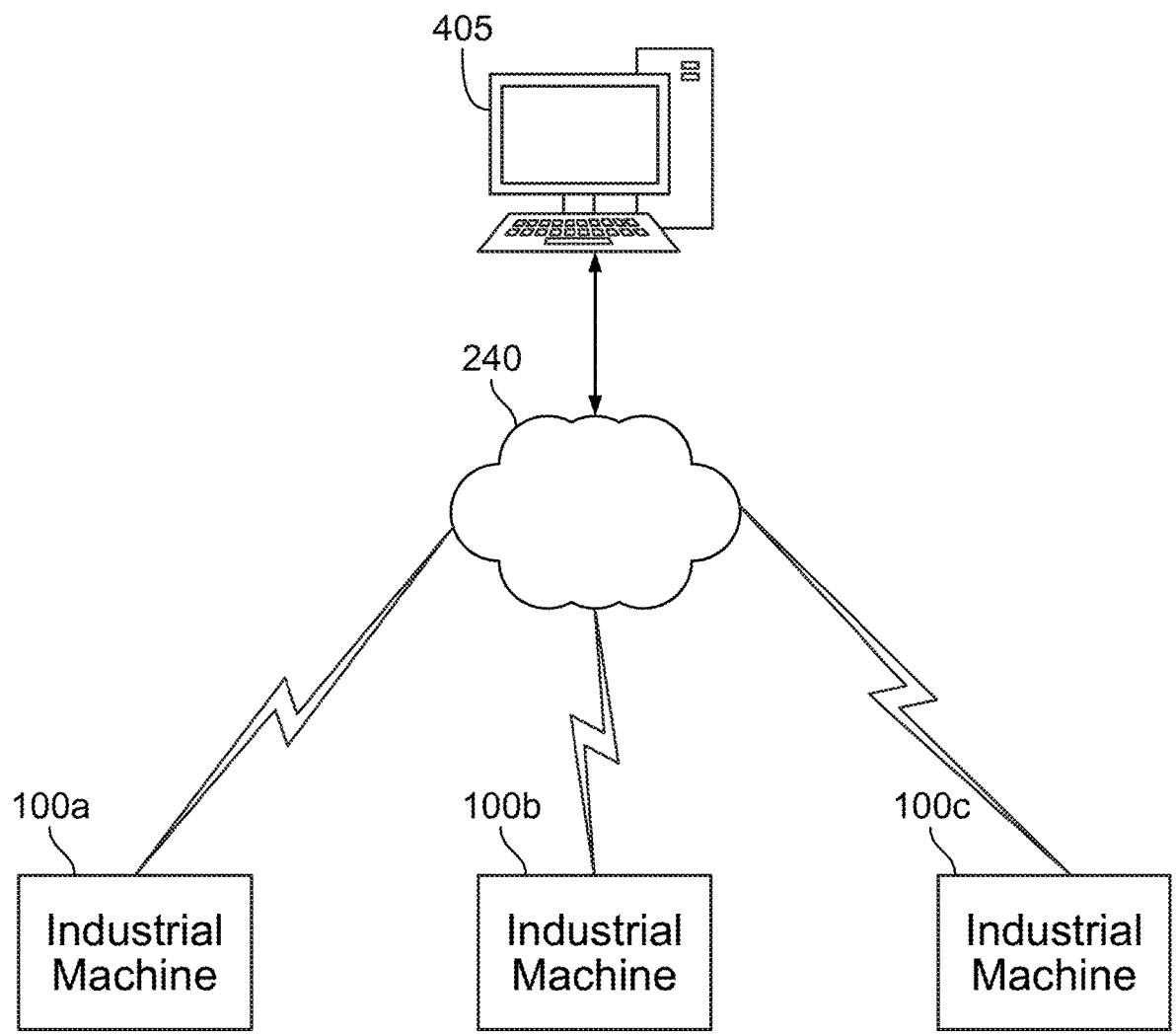
FIG. 6 is a block diagram of a network including the industrial machine of FIG. 1 according to some embodiments.

FIG. 6 illustrates the network 240 according to some embodiments. As illustrated, the network 240 may provide communication between a main computer, or server, 405 and one or more industrial machines 100 (for example, industrial machines 100a-100c). In some embodiments, the main computer 405 is remotely located from the industrial machines 100.

In operation, the main computer 405 may receive, via network 240, operational and/or status information of one or more industrial machines 100. For example, information related to a contaminant level of the one or more industrial machines 100. In some embodiments, the contaminant level of each industrial machine 100 may be accessed by the main computer 405 via the network 240. In some embodiments, when the contaminant level crosses the threshold (for example, as illustrated in block 320 of FIG. 5), the alert may be output to the main computer 405 via the network 240.

Thus, embodiments provide, among other things, a system and method for determining an amount of water in oil for a mining machine. Various features and advantages of the application are set forth in the following claims.

What is claimed is:

1. An industrial machine comprising:
   a sensor configured to sense a characteristic of a fluid of the industrial machine, wherein the characteristic is indicative of a contaminant level, wherein the contaminant is water and the fluid is oil contained within a gear box that is driven by a motor and that drives a cutting drum of the industrial machine;
   a controller having an electronic processor and a memory, the controller configured to
      receive a signal from the sensor indicative of the contaminant level,
      compare the contaminant level to a threshold, and
      upon the contaminant level crossing the threshold perform at least one selected from a group consisting of:
         output an alert, and
         commence a shutdown procedure of the industrial machine,
   wherein the sensor is a first sensor of a plurality of sensors coupled to the controller and configured to sense the characteristic of the fluid contained within the gear box, where each sensor of the plurality of sensors is associated with a respective gear of the gear box.

2. The industrial machine of claim 1, wherein the industrial machine is a longwall shearer and further comprises:
   a sprayer associated with the cutting drum;
   a second motor;
   a second cutting drum on an opposite end of the longwall shearer than the cutting drum;
   a second gear box that is driven by the second motor and that drives the second cutter drum; and
   a second sprayer associated with the second cutting drum.

3. The industrial machine of claim 1, wherein the controller is further configured to:
   output the contaminant level to an external device.

4. The industrial machine of claim 3, wherein the external device is configured to analyze one or more contaminant levels.

5. The industrial machine of claim 3, wherein the external device is a remotely located computer.

6. The industrial machine of claim 1, wherein the alert is output to a remote server.

7. The industrial machine of claim 6, wherein the remote server is configured to receive a second alert from a second industrial machine.

8. The industrial machine of claim 1, wherein the alert is output to a user-interface.

9. The industrial machine of claim 1, wherein the industrial machine is a longwall shearer and the gear box is part of an arm supporting the cutter drum and connecting the cutter drum to a frame of the longwall shearer.

10. The industrial machine of claim 1, wherein the threshold is a first threshold, and the controller is further configured to
    output the alert in response to the contaminant level crossing the first threshold;
    receive a further signal from the sensor indicative of a later contaminant level at a later point in time than the signal from the sensor is received,
    compare the later contaminant level to a second threshold, and
    upon the later contaminant level crossing the second threshold, commence the shutdown procedure of the industrial machine in response to determining that the later contaminant level crosses the second threshold.

11. A method of controlling an industrial machine, the method comprising:
    sensing, via a sensor, a contaminant level of oil contained within a gear box of the industrial machine, wherein the contaminant level is indicative of an amount of water in the oil, and wherein the gear box is driven by a motor and drives a cutting drum of the industrial machine;
    comparing, via a controller, the contaminant level to a threshold;
    upon the contaminant level crossing the threshold, performing at least one selected from a group consisting of:
       outputting an alert, and
       commencing, via the controller, a shutdown procedure of the industrial machine,
    wherein the sensor is a first sensor of a plurality of sensors coupled to the controller and configured to sense the characteristic of the fluid contained within the gear box, where each sensor of the plurality of sensors is associated with a respective gear of the gear box.

12. The method of claim 11, further comprising:
    outputting the contaminant level to an external device.

13. The method of claim 12, further comprising:
    analyzing, via the external device, one or more contaminant levels.

14. The method of claim 11, wherein the industrial machine is a longwall shearer.

15. The method of claim 11, wherein the alert is output via a user-interface.

16. The method of claim 11, wherein the alert is received by a remotely located computer.

17. The method of claim 11, wherein the threshold is a first threshold, and method further comprises:
    outputting the alert in response to the contaminant level crossing the first threshold;
    sensing, via the sensor, a later contaminant level at a later point in time than the contaminant level is sensed by the sensor,
    comparing, via the controller, the later contaminant level to a second threshold, and
    upon the later contaminant level crossing the second threshold, commencing the shutdown procedure of the industrial machine in response to determining that the later contaminant level crosses the second threshold.

18. An industrial machine comprising:
    a first sensor configured to sense a characteristic of a fluid of the industrial machine, wherein the characteristic is indicative of a contaminant level, wherein the contaminant is water and the fluid is oil contained within a gear box that is driven by a motor and that drives a cutting drum of the industrial machine;
    a controller having an electronic processor and a memory, the controller configured to
       receive a signal from the first sensor indicative of the contaminant level,
       compare the contaminant level to a threshold, and upon the contaminant level crossing the threshold perform at least one selected from a group consisting of:
   output an alert, and
   commence a shutdown procedure of the industrial machine;
a second sensor configured to sense the characteristic of the fluid contained within the gear box, the first sensor located nearer to a first gear of the gear box than the second sensor, and the second sensor located nearer to a second gear of the gear box than the first sensor,
wherein the controller is configured to
   receive a further signal from the second sensor indicative of a contaminant level of the fluid near the second sensor,
   compare the contaminant level of the fluid near the second sensor to the threshold, and
   upon the contaminant level of the fluid near the second sensor crossing the threshold, perform at least one selected from a group consisting of:
      output the alert, and
      commence the shutdown procedure of the industrial machine.

19. The industrial machine of claim 18, wherein the industrial machine is a longwall shearer and the gear box is part of an arm supporting the cutter drum and connecting the cutter drum to a frame of the longwall shearer.

20. The industrial machine of claim 18, wherein the threshold is a first threshold, and the controller is further configured to
   output the alert in response to the contaminant level crossing the first threshold;
   receive a further signal from at least one of the first sensor and the second sensor indicative of a later contaminant level at a later point in time than the signal from the sensor is received,
   compare the later contaminant level to a second threshold, and
   upon the later contaminant level crossing the second threshold, commence the shutdown procedure of the industrial machine in response to determining that the later contaminant level crosses the second threshold.

* * * * *